United States Patent Office

2,811,501
Patented Oct. 29, 1957

2,811,501

VULCANIZED FLUOROACRYLATE POLYMERS

Paul J. Stedry, St. Paul, Minn., assignor to Minnesota Mining & Manufacturing Company, St. Paul, Minn., a corporation of Delaware No Drawing. Application December 21, 1953,
Serial No. 399,575

4 Claims. (Cl. 260—41)

This invention relates to new and useful vulcanized fluoroacrylate polymers.

It provides rubbery vulcanized polymers that are stable even at elevated temperatures (up to at least 175° C.), are strong and snappy, have good low-temperature flexibility, have excellent resistance to oxidation by air, pure oxygen and ozone, have excellent resistance to fuming nitric acid, and have excellent resistance to hydrocarbon fuels, to aliphatic and aromatic oils, to ester type synthetic hydraulic fluids and lubricants, and to common organic solvents. These vulcanized polymers can be used to provide nonflammable coatings, liners and gaskets having exceptional utility for applications where various of the above-mentioned properties are of critical importance. Molded, extruded and cast articles of varied and useful shapes can be manufactured.

I have discovered that these objectives can be attained by vulcanizing with polyfunctional polyamine curing agents the polymers of normal 3-perfluoroalkoxy-1,1-dihydroperfluoropropyl acrylate ester monomers which contain 3 to 6 fully fluorinated carbon atoms in the molecule. These ester monomers can be represented by the following formulas, the second being in abbreviated form:

CH$_2$:CHCOOCH$_2$CF$_2$CF$_2$O(CF$_2$)$_n$F

CH$_2$:CHCOOCH$_2$C$_2$F$_4$OC$_n$F$_{2n+1}$ where n has an integer value of 1 to 4 and is the number of carbon atoms in the terminal perfluoroalkoxy group. These esters and their polymers are described more fully and are claimed in the companion application of F. A. Bovey and J. F. Abere, S. N. 399,568, filed of even date herewith, and since abandoned in favor of the continuation-in-part application, S. N. 640,348, filed Feb. 15, 1957.

The polyfunctional polyamine curing agents are organic compounds containing two or more primary or secondary amino groups. A preferred example is triethylene tetramine.

This class of vulcanizing agents was previously known to the polymer art and had been used for vulcanizing conventional acrylate polymers, such as polymers of methyl acrylate and ethyl acrylate; monomers of ordinary organic chemistry in which the alkyl group is not fluorinated. To the best of my knowledge, prior to my work it was unknown and unsuspected that these amine curing agents could be used for vulcanizing any polymers of highly fluorinated acrylate esters, which are markedly different in physical and chemical properties from the conventional acrylate polymers, and especially so in the case of polymers of esters that have a chain of three or more fully fluorinated carbon atoms in the molecule and contain approximately 50% or more of combined fluorine. Thus see U. S. Patent No. 2,642,416 (June 16, 1953), which includes an elaborate description of polymers of certain highly fluorinated acrylate esters, and a variety of vulcanization techniques, but contains no mention of using amine curing agents for vulcanizing either the homopolymers or the heteropolymers.

I have discovered not only that these amine curing agents can vulcanize the above-mentioned fluoroacrylate polymers which I employ, but that vulcanized products can be obtained which are superior in their combination of desirable properties to those prepared by using any other vulcanization technique known to me. In particular, by means of my vulcanization procedure there can be obtained vulcanized homopolymers having the best flexibility at low temperatures that is obtainable in combination with a high degree of resistance to fuels, oils, solvents, and ester type synthetic hydraulic fluids and lubricants. In other words, the importance of my discovery does not reside in the mere fact of having found out that these fluoroacrylate polymers can be vulcanized with amine curing agents, but in having discovered that vulcanized products of superior utility can be made. Vulcanized rubbery compositions can be made which are without precedent and are superior for certain critical usages to all previously known rubbery or elastomeric materials, to the best of my knowledge and belief.

The aforesaid 3-perfluoroalkoxy-1,1-dihydroperfluoropropyl acrylate ester monomers can be readily polymerized by bulk, solution and emulsion procedures, using the techniques described in the aforesaid U. S. Patent No. 2,642,416. Emulsion polymerization in aqueous media is the preferred procedure, yielding stable translucent latices that may contain 25–35% solids. The latex can be diluted and frozen to coagulate the rubbery polymer, which is then washed with water and dried. The homopolymers of the methoxy and ethoxy esters have good snappy elastic properties. The homopolymers of the propoxy and butoxy esters are somewhat inferior in rubbery properties, although much improved by vulcanization. Bulk and solution polymerization procedures can also be employed to make rubbery polymers. Mercaptan or other chain transfer agents can be employed to obtain polymers of lower average molecular weight, including liquid polymers. The latter can be vulcanized to obtain solid rubbery or non-rubbery materials.

Useful heteropolymers can be made by copolymerization of these perfluoroalkoxy ester monomers with other polymerizable monomers containing an ethylenic linkage. Examples of such co-monomers are butadiene, styrene, acrylonitrile, isoprene, vinyl ethers, acrylates, methacrylates, and halogenated derivatives of such monomers, such as perfluorobutadiene and fluoroprene. Use can be made as comonomers of the 1,1-dihydroperfluoroalkyl acrylate esters which do not contain an ether oxygen atom,

CH$_2$:CHCOOCH$_2$C$_n$F$_{2n+1}$

Heteropolymers employed in practicing the present invention should contain at least 50 mol percent of the perfluoroalkoxy acrylate component. Homopolymers of the perfluoroalkoxy acrylates (which contain substantially 100% of this monomeric component) can be employed as already indicated and are generally more desirable than the heteropolymers.

The presently preferred products of this invention are the homopolymers of the methoxy and ethoxy acrylate esters, vulcanized with a polyfunctional amine curing agent to obtain rubbery products having the maximum resistance to nitric acid and to fuels, oils, solvents and hydraulic fluids, combined with good low-temperature flexibility.

Maximum strength is obtained by compounding the polymer and vulcanizing agent with a substantial proportion of a reinforcing pigment (such as carbon black). Further benefits may be obtained by including in the mix a small proportion of sulfur, which prevents premature cross-linking during processing and extends the useful service life at elevated temperatures, and a small proportion of a higher fatty acid (such as stearic acid), which aids in the processing and also catalyzes the cross-linking reaction. These are optional ingredients. The presence of metal oxides should be avoided since they interfere seriously with the cure.

A preferred amine curing agent is triethylene tetramine:

$H_2NC_2H_4NHC_2H_4NHC_2H_4NH_2$

This aliphatic compound contains two primary and two secondary amino groups, linked in a chain by three ethylene groups, and is a member of the class of unsubstituted polyalkylene polyamine compounds. As is understood in the polymer art, there is a wide variety of polyfunctional polyamine compounds available as curing agents, the requirement being that they contain at least two amino groups of the primary or secondary (but not tertiary) types to provide a plurality of functional amino groups that produce cross-linking between the polymer chains. Aliphatic polyamines are preferred since they are much more reactive than aromatic polyamines, and their reactivity increases with an increasing ratio of amino groups to carbon atoms in the molecule. The cross-linking "vulcanization" reaction proceeds by splitting out of the appropriate side group alcohol and by formation of di- or higher amides. The following are further examples of preferred polyamine curing agents that I have tested: tetraethylene pentamine, hexamyethylene diamine, propylene diamine, 1,3-diamino butane, hydroxyethyl ethylene diamine, aminoethyl ethanolamine, and "trimene base"; the latter being a reaction product of ethyl chloride, formaldehyde and ammonia, sold by Naugatuck Chemical Division of U. S. Rubber Co. The curing agents are generaly employed in a proportion of 0.5 to 5%.

Compounding of the rubbery polymer can be carried out on conventional rubber mills. Best milling is obtained with the rolls maintained at about 50 to 65° C. (120 to 150° F.). No initial breakdown is required, as the rubber bands almost immediately. It tends to split and band around both rolls, but can be stripped readily. The compounding agents are preferably milled in the following order: (1) stearic acid or other processing aid, (2) carbon black or other reinforcing pigment, (3) sulfur, (4) polyamine curing agent, added slowly in order to maintain a good rolling bank. The mastication period should be kept as short as consistent with obtaining thorough dispersion of ingredients. Masterbatching techniques are possible and are usually beneficial.

Curing temperatures from about 140 to 170° C. (280 to 340° F.) are suitable with conventional platen pressures, using a curing period of about one hour. Considerably shorter curing periods can be used by increasing the amount of curing agent or by increasing the temperature, or both. In order to improve certain properties, particularly compression set, it is advantageous to heat the piece in an air oven after molding; 24 to 48 hour tempering at 150° C. (300° F.) has been found satisfactory.

The use of a reinforcing pigment is essential to obtain rubbery products of adequate tensile strength and elasticity for most purposes. The most satisfactory carbon blacks are non-acidic furnace blacks, used in the proportion of about 20 to 50 parts by weight per 100 parts of the rubbery polymer. The best results have thus far been obtained by using about 35 parts of HAF carbon black (high abrasion furnace black), a commercial example of which is "Philblack O" (sold by Phillips Chemical Co.), which has an average particle diameter of about 45 millimicrons and a pH of 8.6. Examples of inorganic reinforcing pigments are: precipitated calcium carbonate, precipitated hydrated calcium silicate, and precipitated hydrated silicon dioxide. Metal oxides should be avoided.

The following table gives illustrative compounding formulas:

|  | Parts by weight | |
| --- | --- | --- |
|  | (A) | (B) |
| Polymer | 100 | 100 |
| Stearic acid | 1 | 1 |
| HAF carbon black ("Philblack O") (High abrasion furnace black) | 35 | 35 |
| Sulfur | 1 | 1 |
| Triethylene tetramine | 1 | 1.75 |

Using a rubbery methoxy homopolymer in the above formulas, samples were made up by mixing the ingredients on a rubber mill at 60° C. and vulcanizing strips in a press for one hour at 150° C. Vulcanization in each case transformed the polymer from a thermoplastic material to a strong and elastic rubber, but product (B) was not as strong or elastic as product (A). The vulcanized polymers had the following properties:

|  | (A) | (B) |
| --- | --- | --- |
| Tensile strength (p. s. i.) | 1,060 | 620 |
| Elongation at break (percent) | 270 | 90 |
| Set at break (percent) | 8 | 4 |
| $T_{10}$ (° C.) | −25 | −22 |
| Brittle point (° C.) | −37 | −39 |
| Percent swell after 48 hours at 25° C. in: | | |
| Iso-octane: toluene (70:30) | 23 | 14 |
| Benzene | 26 | 18 |
| Acetone | 59 | 61 |
| Ethyl acetate | 69 | 73 |
| Iso-octane | | 9 |
| Methyl isobutyl ketone | | 33 |
| Methyl ethyl ketone | | 62 |
| Ethyl alcohol | | 9 |
| Sodium hydroxide (10%) | | 160 |
| Sulfuric acid (10%) | | 3 |

Sample strips were immersed in white fuming nitric acid for one week at 25° C. and swelled only 30–40%. They showed no sign of deterioration and remained strong and rubbery. A sample strip of vulcanized polymer (B) was heated in air for 100 hours at 177° C. and showed only a 35% loss of strength and no change in ultimate elongation. Another sample was immersed in a dioctyl sebacate type of synthetic lubricant for 100 hours at 177° C.; no swelling occurred, loss of strength was only 18%, and there was no change in elongation. Another sample was immersed in boiling water for 70 hours; it swelled 47% but was not otherwise attacked.

In the above table the "$T_{10}$" values are the Gehman values obtained by measuring the torsional modulus at 25° C. in a Gehman apparatus, and then measuring the modulus at reduced temperatures to determine the temperature at which the modulus is ten times the value for 25° C. The lower the $T_{10}$ value the better the low-temperature flexibility.

A copolymer of the methoxy acrylate monomer and butadiene, the monomer ratio of the copolymer being 59:41 (mol ratio), was compounded according to Formula A given above. These strips were vulcanized in a press for one hour at 150° C. and had the following properties:

|  | (C) |
| --- | --- |
| $T_{10}$ (° C.) | −39 |
| Brittle point (° C.) | −43 |
| Percent swell after 48 hours at 25° C. in: | |
| Iso-octane:toluene (70:30) | 39 |
| Benzene | 42 |
| Acetone | 79 |
| Ethyl acetate | 85 |

A comparison of the above data on the butadiene copolymer with that for the homopolymer, shows that the butadiene somewhat improved low-temperature flexibility but at a sacrifice of resistance to swelling by hydrocarbons and solvents. For most uses, the small gain in low-temperature flexibility does not provide sufficient compensation for the marked decrease in other properties.

In a further experiment using a homopolymer of the methoxy acrylate from a different batch, compounded as in Formula A above but with omission of the stearic acid, test strips vulcanized in a press for one hour at 150° C. were found to have the following properties:

|  | (D) |
|---|---|
| Tensile strength (p. s. i.) | 1000 |
| Elongation at break (%) | 400 |
| $T_{10}$ (° C.) | −30 |
| Brittle point (° C.) | −40 |
| Percent swell after 48 hours at 25° C. in: | |
| Iso-octane:toluene (70:30) | 15 |
| Benzene | 19 |
| Acetone | 64 |

Using the same compounding formula but substituting 2.0 parts of "trimene base" as the curing agent, and vulcanizing for one hour at 150° C., test strips were found to have closely similar properties, the tensile strength being 1020 p. s. i. and the ultimate elongation being 420%.

*Preparation of polymers and monomers*

Emulsion polymerization in an aqueous vehicle to obtain a latex dispersion is the generally preferred procedure for making the fluoroacrylate homopolymers and heteropolymers employed in the present invention. The following are typical emulsion recipes:

|  | Parts by weight | |
|---|---|---|
|  | (I) | (II) |
| Ester monomer | 100 | 100 |
| Water (deoxygenated) | 180 | 180 |
| "Duponol ME" (sodium lauryl sulfate) | 3 | 3 |
| Borax | 2 |  |
| $Na_2S_2O_8$ | 1 |  |
| $K_2S_2O_8$ |  | 0.5 |

The reaction vessel is charged with the aqueous phase, the air is flushed out with nitrogen, and then the ester monomer is added. The vessel is sealed and the mixture is heated at a temperature of about 50° C. and stirred or agitated for about 2½ to 6 hours, the higher esters requiring longer reaction times. The resultant latex is stable and can be stored. It can be used as such; for instance, as an impregnating, coating or casting composition.

The latex can be diluted and frozen to coagulate the rubbery polymer, which is then washed with water and dried at 50° C. for 24 hours, resulting in a dried polymer mass that is tacky and will stick to a glass container.

A similar emulsion polymerization procedure can be employed for making heteropolymers. Thus copolymers of the alkoxy type monomers with corresponding perfluoro acrylate ester monomers that do not contain an ether-oxygen atom (cf. U. S. Patent 2,642,416), can be made by using the above recipes but with a mixture of the comonomers. Copolymers with butadiene can be made in a similar way by charging butadiene to the vessel, the total monomer charge being figured as 100 parts in following the recipe. In this case reaction times vary from 3 to 24 hours at 50° C. For best results, conversions should not be carried beyond 65–70%. An anti-oxidant, such as phenyl beta-naphthylamine, should preferably be added, either to the latex or by milling it into the dried copolymer mass.

Measured physical properties of the methoxy, ethoxy, propoxy and butoxy species of normal 3-perfluoroalkoxy-1,1-dihydroperfluorpropyl acrylate esters, all of which are liquid at normal temperatures, are given in the following table, which lists the vacuum boiling points at the specified pressures, and the refractive indices and densities at 20° C.

| Formula | B. P. (° C.) | $n_D^{20}$ | $d_4^{20}$ |
|---|---|---|---|
| $CH_2{:}CHCOOCH_2C_2F_4OCF_3$ | 54 (50 mm.) | 1.328 | 1.421 |
| $CH_2{:}CHCOOCH_2C_2F_4OC_2F_5$ | 52 (30 mm.) | 1.320 | 1.460 |
| $CH_2{:}CHCOOCH_2C_2F_4OC_3F_7$ | 44 (9 mm.) | 1.319 | 1.511 |
| $CH_2{:}CHCOOCH_2C_2F_4OC_4F_9$ | 48 (5 mm.) | 1.319 | 1.557 |

These acrylate ester monomers cannot be readily formed by esterification of acrylic acid with the corresponding fluorinated alcohol unless a suitable promoter is used, such as perfluoroacetic anhydride, but are readily prepared when the latter is employed. Another procedure is to react the acid chloride derivative of acrylic acid (acrylyl chloride) with the alcohol. The desired 3-perfluoroalkoxy-1,1-dihydroperfluoropropyl alcohol can be recovered by fractional distillation. The alcohols have the following physical properties; the boiling points being at 740 mm. pressure and the refractive indices and densities being measured at 25° C.:

| Formula | B. P. (° C.) | $n_D^{25}$ | $d_4^{25}$ |
|---|---|---|---|
| $CF_3OC_2F_4CH_2OH$ | 98 | 1.289 | 1.595 |
| $C_2F_5OC_2F_4CH_2OH$ | 106 | 1.287 | 1.600 |
| $C_3F_7OC_2F_4CH_2OH$ | 120 | 1.289 | 1.650 |
| $C_4F_9OC_2F_4CH_2OH$ | 136 | 1.292 | 1.698 |

These alcohols can be prepared by the lithium aluminum hydride reduction of the methyl esters of the normal perfluoro(beta-alkoxypropionic) acids:

$$F(CF_2)_nOCF_2CF_2COOCH_3 \xrightarrow{LiAlH_4} F(CF_2)_nOCF_2CF_2CH_2OH$$

The perfluoro(beta-alkoxypropionic) acids used for making the methyl esters can be readily prepared by hydrolysis of the corresponding sodium or potassium salts, by adding the salt to concentrated sulfuric acid and distilling off the perfluoro acid. The salts can be readily prepared by hydrolyzing the corresponding acid fluorides in aqueous NaOH or KOH solution. The perfluoro(beta-alkoxypropionyl) fluorides, $F(CF_2)_nOCF_2CF_2COF$, can be obtained in useful yields from the corresponding hydrocarbon beta-alkoxypropionyl fluorides and chlorides by dissolving the latter in anhydrous hydrogen fluoride and electrolyzing the solution in a nickel-anode, iron-cathode cell at 0 to 20° C. and atmospheric pressure, the applied cell voltage being approximately 5 to 6 volts. Depending on the volatility of the particular acid fluoride product and the operating conditions, it will evolve with the cell gases or will settle to the bottom of the cell, and can be recovered by fractional distillation.

The preparation of the above fluoroacrylate esters and polymers, and the corresponding alcohols, is described in more detail in the previously-mentioned companion application of F. A. Bovey and J. F. Abere, S. N. 399,568 (since abandoned in favor of S. N. 640,348, filed Feb. 15, 1957); and the preparation of the ancillary methyl esters and acids in the companion application of T. J. Brice, W. H. Pearlson and H. M. Scholberg, S. N. 399,574; both filed of even date herewith. The latter application has since issued as Patent No. 2,713,593 (July 19, 1955).

I claim:

1. A vulcanized polymer product resulting from heating at vulcanization temperature a mixture comprising a polyfunctional aliphatic polyamine curing agent and a polymer containing at least 50 mol percent of polymerized normal 3-perfluoroalkoxy-1,1-diphydroperfluoropropyl acrylate component having the monomeric formula:

$$CH_2{:}CHCOOCH_2CF_2CF_2O(CF_2)_nF$$

where $n$ has an integer value of 1 to 4.

2. A rubbery vulcanized polymer product resulting from heating at vulcanization temperature a mixture comprising a polyfunctional aliphatic polyamine curing agent, a reinforcing pigment, and a rubbery polymer containing at least 50 mol percent polymerized normal 3-perfluoroalkoxy-1,1-dihydroperfluoropropyl acrylate component having the monomeric formula:

$$CH_2{:}CHCOOCH_2CF_2CF_2O(CF_2)_nF$$

where $n$ has an integer value of 1 to 4.

3. A rubbery vulcanized polymer product resulting from heating at vulcanization temperature a mixture comprising a polyfunctional aliphatic polyamine curing agent, a carbon black reinforcing pigment, and a rubbery homopolymer of 3-perfluoromethoxy-1,1-dihydroperfluoropropyl acrylate.

4. A rubbery vulcanized polymer product resulting from heating at vulcanization temperature a mixture comprising a polyfunctional aliphatic polyamine curing agent, a carbon black reinforcing pigment, and a rubbery homopolymer of 3-perfluoroethoxy-1,1-dihydroperfluoropropyl acrylate.

No references cited.